United States Patent [19]

Zahavi et al.

[11] Patent Number: 5,410,367
[45] Date of Patent: Apr. 25, 1995

[54] TELEVISION PROGRAM SCHEDULER FOR PROVIDING AN INDICATION TO A USER THAT A TELEVISION PROGRAM IS ABOUT TO START

[75] Inventors: Issashar Zahavi, Netanya; Avi Weiner, Tel Aviv, both of Israel

[73] Assignee: AQI Ltd., Petah Tikva, Israel

[21] Appl. No.: 200,333

[22] Filed: Feb. 23, 1994

[51] Int. Cl.6 .............................................. H04N 5/44
[52] U.S. Cl. .................................... 348/725; 348/906
[58] Field of Search ................................ 348/725, 906; H04N 5/44; 455/344, 351

[56] References Cited

U.S. PATENT DOCUMENTS 4,396,941  8/1983  Nishimura ........................ 455/344
4,456,925  6/1984  Skerlos .............................. 455/344

FOREIGN PATENT DOCUMENTS 63-279680  11/1988  Japan .
4200082  7/1992  Japan .
9312612  6/1993  WIPO .

*Primary Examiner*—James J. Groody
*Assistant Examiner*—Sherrie Hsia
*Attorney, Agent, or Firm*—Mark M. Friedman

[57] ABSTRACT

A television program scheduler for providing an indication to a user that a television program is about to start. The scheduler includes a clock for keeping date and time, a keyboard for inputting information relating to a user selected schedule of one or more television programs, a display for displaying at least a portion of the information and control apparatus for comparing the date and start time of the television programs to the date and time of the clock for providing an indication to the user starting a predetermined period of time before the start of a television program.

26 Claims, 3 Drawing Sheets

TELEVISION PROGRAM SCHEDULER FOR PROVIDING AN INDICATION TO A USER THAT A TELEVISION PROGRAM IS ABOUT TO START

FIELD AND BACKGROUND OF THE INVENTION

The present invention relates to timer devices, in general, and, more particularly, to devices for reminding the user of upcoming events.

One of the reasons for the popularity of video cassette recorders (VCRs) is their pre-set recording of television programs when the consumer is not at home. However, very often the consumer is at home when he wants to watch a particular television program and therefore he tends not to preset the VCR which can often be a time consuming and cumbersome procedure, particularly when pre-setting it to record a number of programs.

This is still true even though recently the pre-setting of VCRs has been simplified by the adoption of dedicated schedule codes for each television program such that a user now only has to input just the one schedule code to pre-set a VCR to record a particular television program rather than a number of parameters, for example, date, start time and end time, or start time and duration, and channel.

All in all, a consumer often misses the beginning of, or even an entire, television program which he had intended on watching due to oversight and therefore, there is a need for a television program scheduler which provides an indication to a user before the start of a television program which he wants to watch.

SUMMARY OF THE INVENTION

According to the present invention, there is provided a television program scheduler for providing an indication to a user that a television program is about to start, comprising: (a) a clock for keeping date and time; (b) inputting means for inputting information relating to a user selected schedule of at least one television program, wherein the information includes date and start time of the at least one television program; (c) a display for displaying at least a portion of the information; (d) control means for comparing the date and start time of the at least one television program to the date and time of the clock; and (e) indicating means for providing the indication to the user in response to the control means, the indication being initiated a pre-determined period of time before the start of the at least one television program.

The schedule information is preferably in the form of the newly adopted schedule codes of television programs which include date, start time and end time or start time and duration and channel. Alternatively, the user can input the schedule information using a dedicated scheduling routine. Still again, the television program scheduler can also include a microphone and speech recognition circuitry for receiving commands and information spoken by the user.

A typical pre-determined period of time before the start of a television program that the scheduler provides an indication to a user is in the range of 5-30 minutes. However, this period of time can be set by the user according to his personal requirements.

The indication to the user that a scheduled television program is about to start can be through activating a buzzer or an LED or flashing the display. The level of indication is preferably adapted as a function of time before the start of a scheduled television program to impress upon the user that start of a scheduled television program he wants to watch is approaching. This can be achieved in one or more ways including increasing the rate of flashing of the display or the LED or increasing the sound emitted by the buzzer as the time kept by clock approaches the start time of a scheduled television program.

Additional information can be inputted regarding the television programs that the user wants to schedule including a descriptor of the television program, and whether the television program is repeated on a daily and weekly basis on weekdays or on weekends, thereby saving the user the bother of having to input the schedule information himself on a regular basis.

Typically, the television program scheduler will be at the disposal of several members of a household at the same time and therefore entries of scheduled television programs of one member of the household can be inadvertently or even purposefully erased by another member. Therefore, to protect entries of different members of a household, an entry can be assigned the name of the member of the family who programmed it and can be protected using a secret code such that it cannot be erased except by inputting the security code.

The television program scheduler can also be implemented to display information of the scheduled programs that the user wants to watch on a stand-alone display. The stand-alone display is preferably associated with a television set and can either be the television screen or incorporated in the housing of the television set.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a television program scheduler for providing an indication to a user that a television program is about to start and is also of a system for displaying information about a user selected schedule of television programs.

The principles and operation of the television program scheduler and the system for displaying information about a user selected schedule of television programs of the present invention may be better understood with reference to the drawings and the accompanying description.

Figure 1:
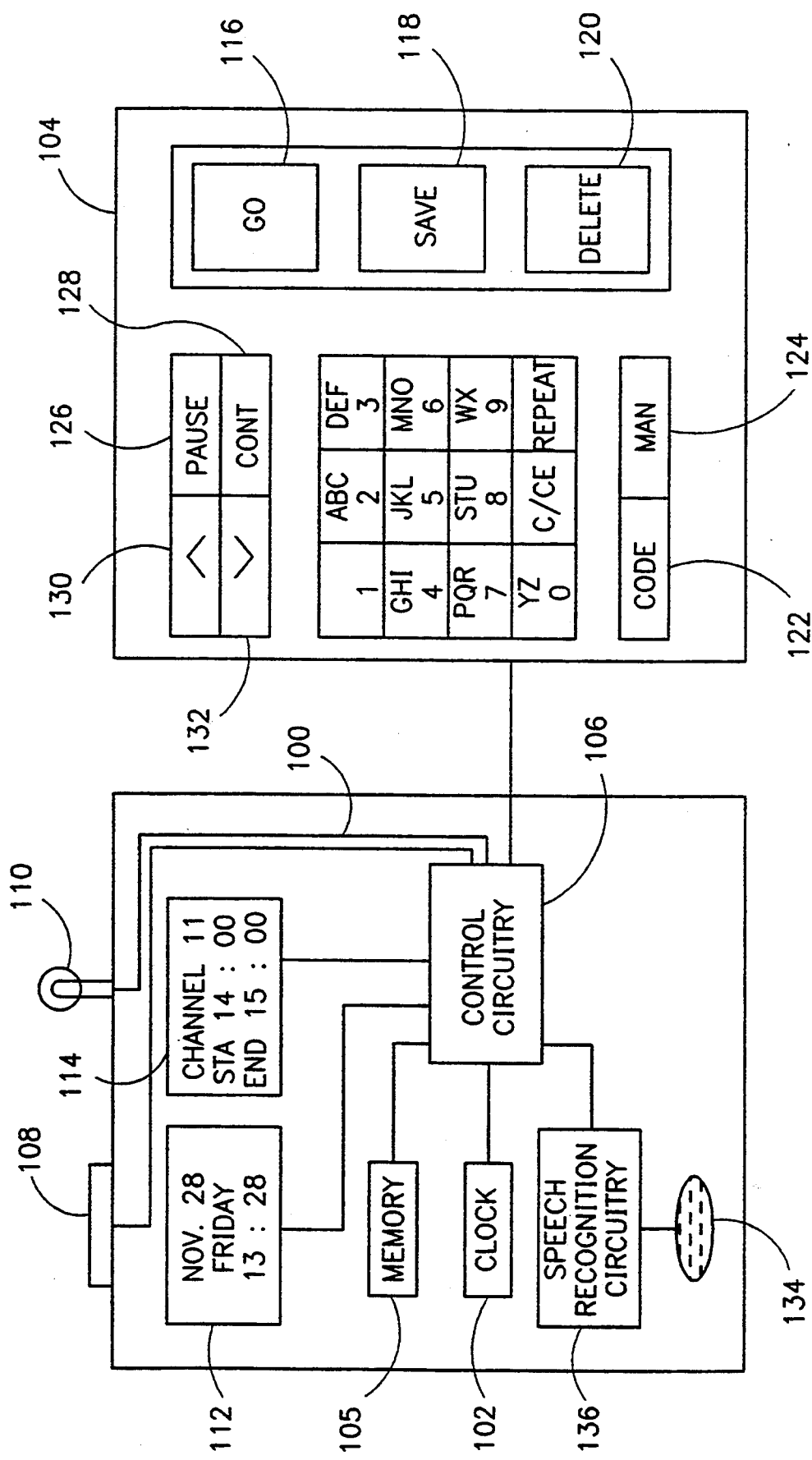
FIG. 1 shows a combined block diagram and schematic illustration of a preferred embodiment of a basic version of a television program scheduler according to the present invention configured as a hand-held portable device.

Referring now to the drawings, FIG. 1 illustrates a preferred embodiment of the basic version of a television program scheduler, generally designated 100, constructed and operative according to the teachings of the present invention, configured as a hand-held portable device similar to a presently available remote control devices of televisions and VCRs.

Television program scheduler 100 generally includes a clock 102 for keeping date and time, a keyboard 104 having pushbuttons for operating scheduler 100 and inputting information relating to a schedule of television programs, memory 105 for storing the information, control circuitry 106 for activating a buzzer 108 or an LED 110 for providing an indication a pre-determined period of time before the start of a television program that a user scheduled that he wants to watch, a display 112 for displaying the date and time kept by clock 102 and a display 114 for displaying at least a portion of the information. Scheduler 100 can also use display 114 for providing an indication to a user about the start of a scheduled television program by flashing its display.

Pushbuttons for supporting the operation of television program scheduler 100 and the input of schedule information are preferably labelled with an icon or a function name. The pushbuttons typically include pushbuttons 116, 118 and 120 denoted GO, SAVE and DELETE, respectively, for initiating a procedure to store schedule information about a television program that a user wants to watch, saving the schedule information and deleting the schedule information. The information is preferably data compressed and encoded by control circuitry 106 to economize on size requirements of memory 105.

Schedule information typically includes the date, start time and end time or start time and duration, and channel of the television programs that the user wants to watch. The information is preferably in the form of the newly adopted schedule codes of television programs inputted using a pushbutton 122 denoted CODE or, alternatively, can be inputted parameter by parameter in a dedicated programming routine using a pushbutton 124 denoted MAN.

Pushbuttons 126 and 128 are used for pausing and continuing the automatic scrolling of the information displayed on display 114 when more than the schedule of television programs to be watched includes more than one program while pushbuttons 130 and 132 are used for incremental forward and backward scrolling.

Rather than manually inputting information, television program scheduler 100 can be provided with a microphone 134 and speech recognition circuitry 136 for receiving commands and information spoken by the user.

Figure 2:
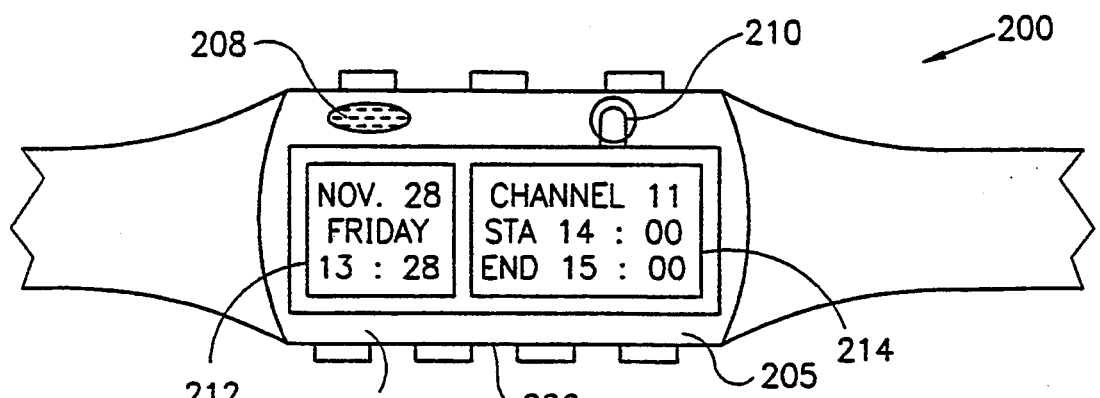
FIG. 2 shows a schematic illustration of a second embodiment of the television program scheduler of FIG. 1 configured as a wristwatch.

With reference now to FIG. 2, a second embodiment of a television program scheduler, generally designated 200, constructed and operative according to the teachings of the present invention is shown configured as a wristwatch for both indoor and outdoor wear. Elements of television program scheduler 200 which are similar to television program scheduler 100 are likewise numbered. However, it should be appreciated that the elements may differ considerably in practice and in operation due to size considerations, etc.. For example, pushbuttons can perform more than one function depending on the number of times that they are pressed.

Figure 3:
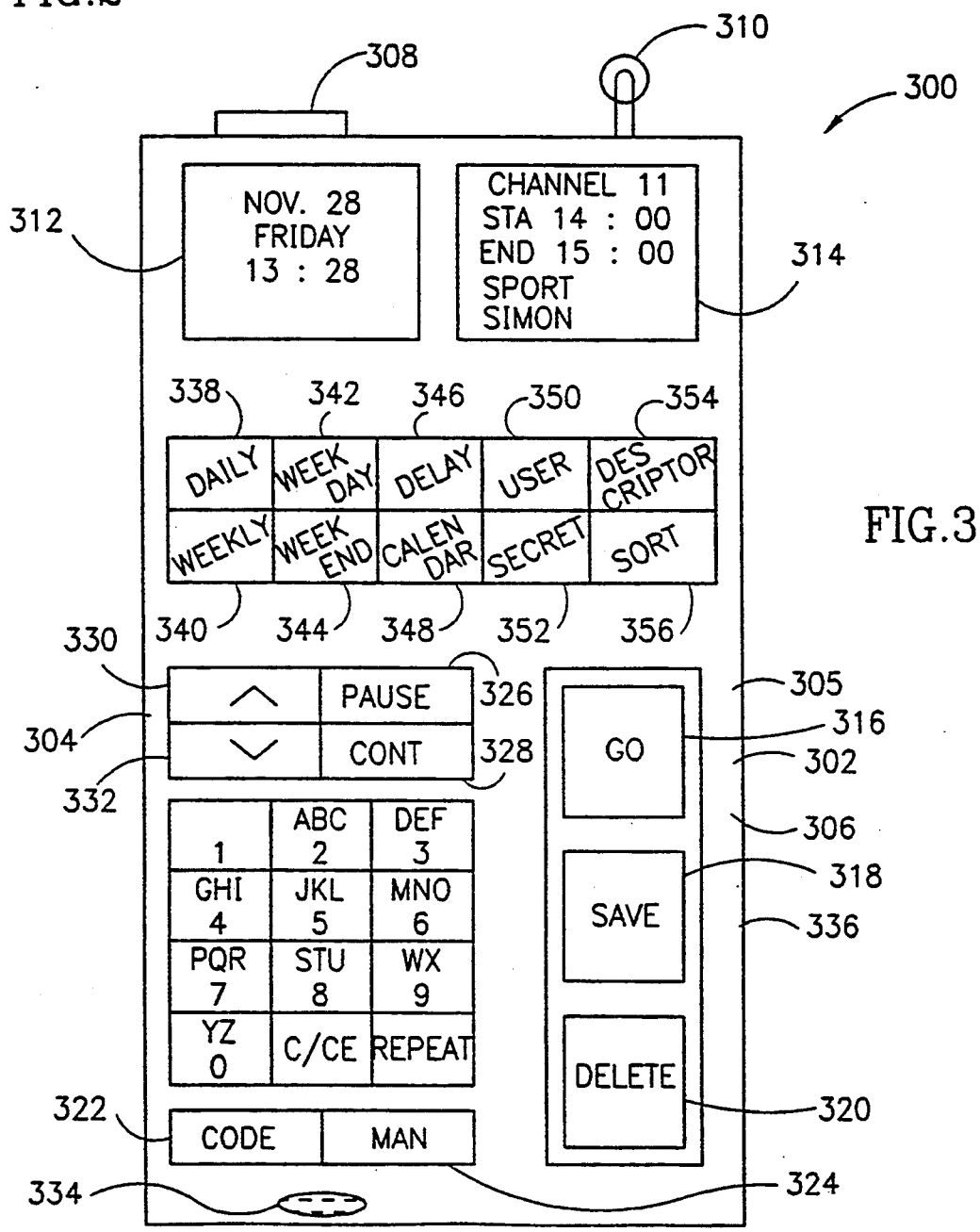
FIG. 3 shows a schematic illustration of an upgraded version of the television program scheduler of FIG. 1.

With reference now to FIG. 3, an upgraded version of television program scheduler 100 is shown generally designated 300 for supporting more sophisticated schedule, user and display functions. Television program scheduler 300 is constructed and operative in a similar manner to television program scheduler 100 and therefore similar elements are likewise numbered. An upgraded version of wristwatch television program scheduler 200 can also be implemented.

Advanced schedule functions can include a DAILY function initiated by a pushbutton 338 and a WEEKLY function initiated by a pushbutton 340 for inputting that a scheduled television program is broadcast on a daily and weekly basis, respectively. In a similar fashion, other functions can include a WEEKDAY function initiated by a pushbutton 342 and a WEEKEND function initiated by a pushbutton 344 for inputting that a scheduled television program is broadcast on weekdays or over the weekend, respectively. These functions are designed to save the user the bother of having to input the schedule information himself on a regular basis.

Still other schedule functions can include a DELAY function initiated by a pushbutton 346 for enabling the user to set the predetermined period of time before a scheduled television program starts that television program scheduler 300 provide its indication and a CALENDAR function initiated by a pushbutton 348 for displaying a calendar with dates flagged for when television programs are to be indicated.

Additional functions can include a USER function initiated by a pushbutton 350 for inputting a code or name of the user who is inputting an entry into television program scheduler 300 and a SECRET function initiated by a pushbutton 352 for protecting an entry such that a particular entry can only be erased after a security personal code is inputted.

A user can also input a descriptor code of a television program using a DESCRIPTOR function initiated by a pushbutton 354 and can display schedule information according to particular parameters using a SORT function initiated by a pushbutton 356.

Figure 4:
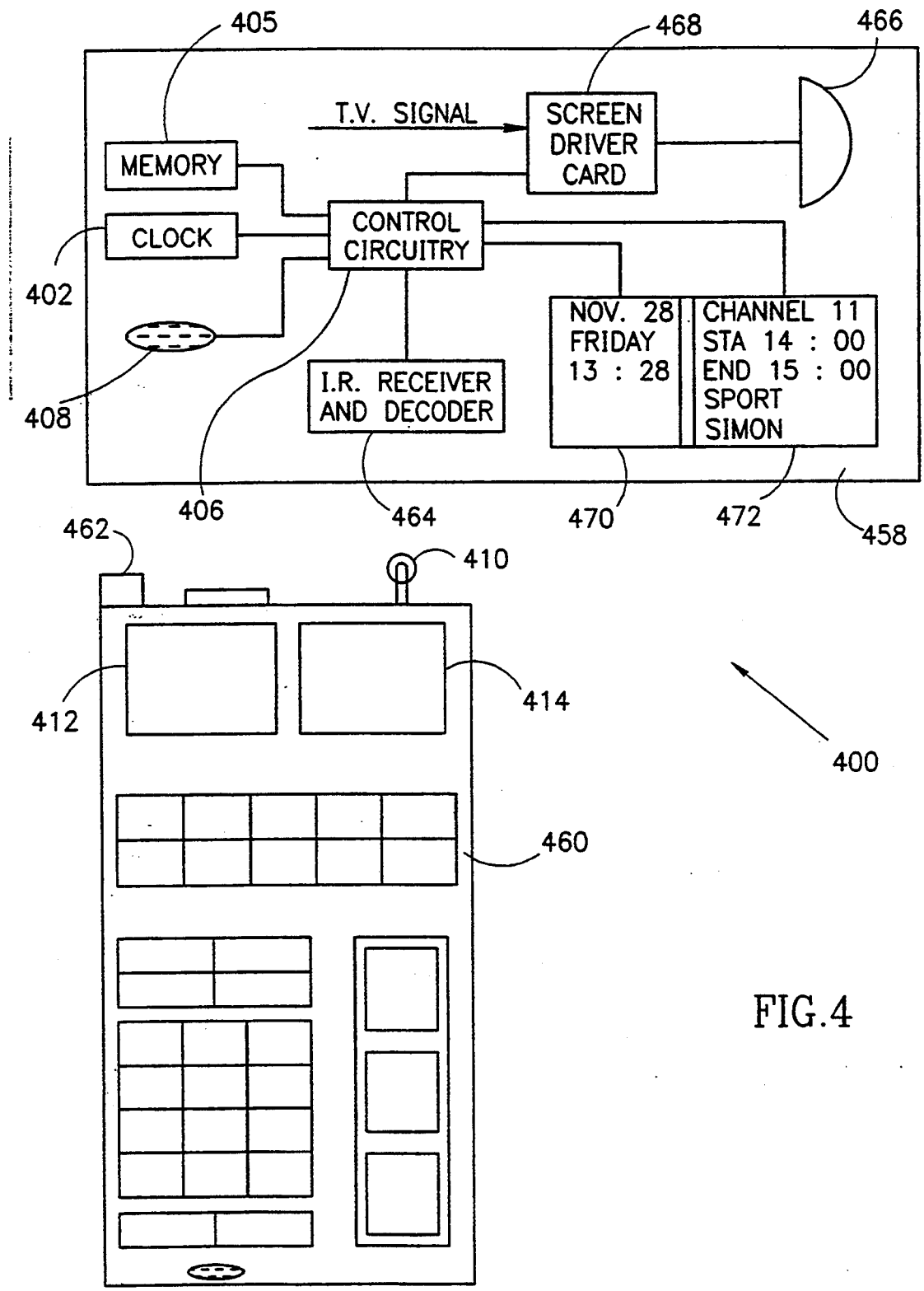
FIG. 4 shows a block diagram of a system for displaying a user selected schedule of television programs.

With reference now to FIG. 4, a system, generally designated 400, constructed and operative according to the teachings of the present invention, is shown for displaying information of a user selected schedule of television programs on a display preferably associated with a television set.

Hence, system 400 includes a television set 458 including memory 405, control circuitry 406 and an IR receiver/decoder 464 for receiving communications from an IR transmitter 462 incorporated in scheduler 460. In other respects, scheduler 460 is similar to television program scheduler 300 and therefore includes clock 402 for keeping date and time and buzzer 408 for providing a sound indication to the user starting a pre-determined period of time before the start of a television program.

Control circuitry 406 displays information of a user selected schedule of television programs either on television screen 466 through screen driver card 468 or on displays 470 and 472 incorporated in the housing of television set 458. The default display is preferably television screen 466 while displays 470 and 472 are used as back-up when television set 458 is in STANDBY mode. The information displayed on television screen 466 and displays 470 and 472 is similar to that displayed on displays 412 and 414.

The operation of a television program scheduler, constructed and operative according to the teachings of the present invention, is described with reference to television program scheduler 300.

First, the user presses GO pushbutton 316 to initiate a procedure to store the schedule information of one or more television programs that he wants to watch.

Then, the user either presses CODE pushbutton 322 and inputs the code, presses MAN pushbutton 324 to initiate a dedicated program routine to input the date, the start time, the end time and the channel parameter by parameter or speaks into microphone 334 to speech input the information. An erroneous entry can be deleted using DELETE pushbutton 320.

At this time, the user can further input additional information regarding the television program including the frequency with which it is broadcast and the type of program using DAILY pushbutton 338, WEEKLY pushbutton 340, WEEKDAY pushbutton 342, WEEKEND pushbutton 344 and DESCRIPTOR pushbutton 354. For example, for inputting schedule information about a daily news program that is broadcast on weekdays, the user presses DAILY pushbutton 338, WEEKDAY pushbutton 342 and then presses DESCRIPTOR pushbutton 354 to enter its descriptor code.

If the user wants to indicate to other members of the household that a particular entry is his, then he is required to press USER pushbutton 350 and enter his personal code. If he wants to protect the entry against erasure, then he is required to press SECRET pushbutton 352 and enter a secret code.

Finally, the user saves the information using SAVE pushbutton 318 at which time it is processed by control circuitry 306 such that it is stored in chronological order in memory 305 for review on display 314 using pushbuttons 326, 328, 320 and 322. Preferably, control circuitry 306 applies a data compression routine to the information stored relating to a particular entry to economize on memory space.

Control circuitry 306 compares the dates and start times of the scheduled television programs to the date and time of clock 302 shown on display 312 to provide an indication to the user starting a pre-determined period of time before the start of the first scheduled television program. A typical pre-determined period of time before the start of a scheduled television program is in the range of 15–30 minutes, however, it can be set by the user using DELAY pushbutton 346 according to his personal requirements. For example, if the user is at home, then he can set the predetermined period of time to 5 minutes. Alternatively, if he is wearing wristwatch television program scheduler 200 when out shopping, then he can set the pre-determined period of time to an hour to enable him to get home in time to watch the television program that he scheduled.

Television program scheduler 300 preferably adapts the indication to the user as a function of time before the start of a scheduled television program to impress upon him the approaching start of a scheduled television program by increasing the rate of flashing of display 314 or LED 310 or the level of sound emitted by buzzer 308 as the time kept by clock 302 approaches the start time of a scheduled television program.

After television program scheduler 300 has provided an indication for a television program, control circuitry 306 preferably deletes the relevant entry except if the particular television program was flagged as being broadcast on a daily or weekly basis, in which case control circuitry 306 updates the schedule information accordingly and retains it in memory 305.

Schedule information can be displayed in a variety of formats, including, for example, as a calendar using CALENDAR pushbutton 348 in which dates when television programs have been scheduled to be indicated are flagged or according to particular parameters by consecutively pressing SORT pushbutton 356 and one of the other pushbuttons. For example, by pressing SORT pushbutton 356 and DAILY pushbutton 338, all the television programs which have been scheduled to be indicated on a daily basis are displayed.

While the invention has been described with respect to a limited number of embodiments, it will be appreciated that many variations, modifications and other applications of the invention may be made.

What is claimed is:

1. A television program scheduler for providing an indication to a user that a television program is about to start, comprising:
   (a) a clock for keeping date and time;
   (b) inputting means for inputting information relating to a user selected schedule of at least one television program, wherein said information includes the date and start time of said at least one television program;
   (c) a display for displaying at least a portion of said information;
   (d) control means for comparing the date and start time of said at least one television program to the date and time of said clock; and
   (e) indicating means for providing the indication to the user in response to said control means, said indication being initiated a pre-determined period of time before the start of said at least one television program.

2. The scheduler as in claim 1, wherein said information includes the date of said at least one television program.

3. The scheduler as in claim 1, wherein said information includes the start time of said at least one television program.

4. The scheduler as in claim 1, wherein said information includes the duration of said at least one television program.

5. The scheduler as in claim 1, wherein said information includes the end time of said at least one television program.

6. The scheduler as in claim 1, wherein said information includes the channel of said at least one television program.

7. The scheduler as in claim 1, wherein said information includes said pre-determined period of time.

8. The scheduler as in claim 1, wherein said information includes a descriptor of said at least one television program.

9. The scheduler as in claim 1, wherein said information includes whether said at least one television program is broadcast daily.

10. The scheduler as in claim 1, wherein said information includes whether said at least one television program is broadcast weekly.

11. The scheduler as in claim 1, wherein said information includes whether said at least one television program is broadcast on a weekday.

12. The scheduler as in claim 1, wherein said information includes whether said at least one television program is broadcast over a weekend.

13. The scheduler as in claim 1, wherein said information includes a code of the user.

14. The scheduler as in claim 13, wherein said information is protected under a secret code of the user.

15. The scheduler of claim 1, wherein said indicating means increases the rate of flashing of said display as the time kept by said clock approaches the start of said at least one television program.

16. The scheduler of claim 1, wherein said indicating means activates an LED for providing said indication.

17. The scheduler as in claim 16, wherein said indicating means increases the rate of activating said LED as the time kept by said clock approaches the start of said at least one television program.

18. The scheduler of claim 1, wherein said indicating means activates a buzzer for providing said indication.

19. The scheduler as in claim 18, wherein said indicating means increases the level of sound emitted by said buzzer as the time kept by said clock approaches the start time of said at least one television program.

20. The scheduler as in claim 1 configured as a hand-held device.

21. The scheduler as in claim 1 configured as a wristwatch.

22. The scheduler as in claim 1, wherein said inputting means includes a keypad.

23. The scheduler as in claim 1, wherein said inputting means includes a microphone and speech recognition circuitry.

24. The scheduler as in claim 1, wherein said information is encoded.

25. The scheduler as in claim 1, wherein said display is a television screen of a television set.

26. The scheduler as in claim 1, wherein said display is incorporated in a housing of a television set.

* * * * *